United States Patent
Metsärinta

(10) Patent No.: US 9,068,240 B2
(45) Date of Patent: Jun. 30, 2015

(54) METHOD FOR PROCESSING SPODUMENE

(75) Inventor: Maija-Leena Metsärinta, Vanha-Ulvila (FI)

(73) Assignee: OUTOTEC OYJ, Espoo (FI)

( * ) Notice: Subject to any disclaimer, the term of this patent is extended or adjusted under 35 U.S.C. 154(b) by 0 days.

(21) Appl. No.: 13/643,502

(22) PCT Filed: May 12, 2011

(86) PCT No.: PCT/FI2011/050440
§ 371 (c)(1),
(2), (4) Date: Oct. 25, 2012

(87) PCT Pub. No.: WO2011/148040
PCT Pub. Date: Dec. 1, 2011

(65) Prior Publication Data
US 2013/0042438 A1    Feb. 21, 2013

(30) Foreign Application Priority Data
May 25, 2010   (FI) .................................... 20100215

(51) Int. Cl.
| | |
|---|---|
| *C01B 33/26* | (2006.01) |
| *C22B 1/00* | (2006.01) |
| *C22B 1/10* | (2006.01) |
| *C22B 26/12* | (2006.01) |
| *F23C 10/00* | (2006.01) |
| *F23C 10/10* | (2006.01) |
| *F23C 10/28* | (2006.01) |

(52) U.S. Cl.
CPC ... *C22B 1/00* (2013.01); *C22B 1/10* (2013.01); *C22B 26/12* (2013.01); *F23C 10/005* (2013.01); *F23C 10/10* (2013.01); *F23C 10/28* (2013.01); *F23C 2206/103* (2013.01); *F23C 2900/10001* (2013.01); *F23L 2900/07006* (2013.01); *Y02E 20/344* (2013.01)

(58) Field of Classification Search
CPC .... C01B 33/26; C01B 33/46; C01B 21/0826; C01B 33/40; C01B 33/42
USPC ................ 501/128, 129; 423/327.1; 502/439; 23/293 R
See application file for complete search history.

(56) References Cited

U.S. PATENT DOCUMENTS

| | | |
|---|---|---|
| 2,972,517 A | 2/1961 | Macewan |
| 3,017,243 A | 1/1962 | Archambault et al. |

FOREIGN PATENT DOCUMENTS

| | | |
|---|---|---|
| CA | 1297265 | 3/1992 |
| CN | 101224900 A | 7/2008 |
| DE | 3622105 A1 | 1/1988 |

OTHER PUBLICATIONS

International Search Report, PCT/FI2011/050440, completed Aug. 23, 2011, mailed Aug. 23, 2011, 3 pages.

*Primary Examiner* — Colleen Dunn
*Assistant Examiner* — Haytham Soliman
(74) *Attorney, Agent, or Firm* — Chernoff, Vilhauer, McClung & Stenzel, LLP

(57) ABSTRACT

The invention relates to a method for thermally processing α-spodumene, i.e. lithium aluminum silicate, by which treatment it is transformed into β-spodumene, which is more advantageous for further processing; in the method, concentrate or ore with a grain size of 20-1,000 μm is processed in a fluidized bed reactor, at a temperature of 800-1,000° C., by using an oxygenous gas as the fluidizing gas.

9 Claims, 1 Drawing Sheet

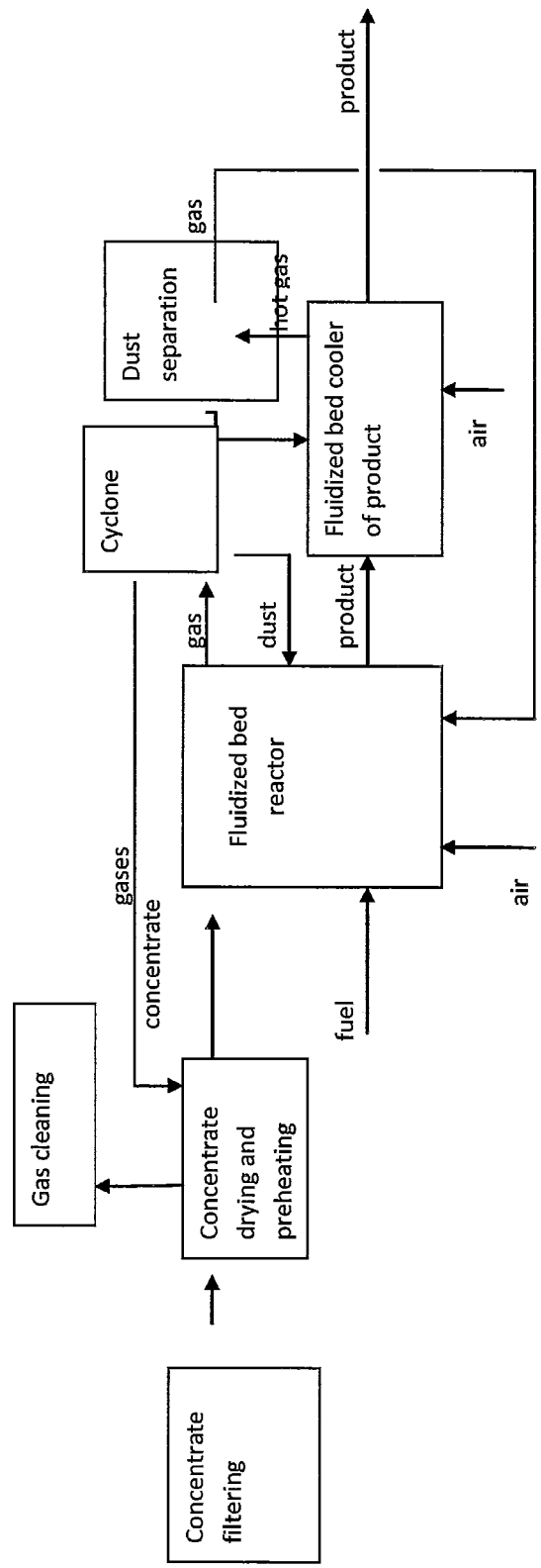

METHOD FOR PROCESSING SPODUMENE

CROSS-REFERENCE TO RELATED APPLICATION

This is a national stage application filed under 35 USC 371 based on International Application No. PCT/FI2011/050440 filed May 12, 2011, and claims priority under 35 USC 119 of Finnish Patent Application No. 20100215 filed May 25, 2010.

FIELD OF INVENTION

The invention relates to a method for thermally processing α-spodumene, or lithium aluminum silicate, by which treatment it is rendered in a form more advantageous for further processing, i.e. soluble β-spodumene.

BACKGROUND OF INVENTION

The largest lithium users at present are glass and ceramic industry as well as battery industry, the share of which is constantly growing, because lithium batteries have a significant role in the development of electric automobiles, for example. Part of the lithium is used as lithium carbonate, or it is at least a commercial intermediate product. Lithium is typically used for instance in the batteries of videos, cameras and mobile phones. Natural lithium-containing minerals are mainly spodumene, petalite and lepidolite. In salt lakes, the hypolimnion may also contain lithium, but there the decisive factor with respect to industrial production is the lithium-magnesium ratio. Likewise, also sea water contains lithium. Lithium is produced by heating and further leaching for example ores or concentrates, such as spodumene, i.e. lithium aluminum silicate ($LiAlSi_2O_6$) or petalite ($LiAlSi_4O_{10}$). In the first recovery step of lithium, the α structure of spodumene is transformed into a soluble β structure. This can be carried out by thermal heating. It has been found out that the alpha structure is converted into a beta structure when the temperature is 850-1000° C. To summarize: in lithium recovery, lithium mineral is concentrated, whereafter the treatment of the concentrate generally includes transformation of the crystal structure at a high temperature, pressure leaching, carbon dioxide treatment, as well as filtering and cleaning of the created lithium bicarbonate $LiHCO_3$.

From the Canadian publication CA 1297265, there is known a process for producing lithium carbonate. According to said publication, the material is thermally treated in a circulating fluidized bed reactor, which requires a high free-space velocity for the gas in the reactor. The concentrate or ore is fed into the process as coarse material, with a grain size of 1-10 millimeters approximately. In order to make said material circulate in a way characteristic for a circulating fluidized bed, a large gas flow is required. The heating of a large gas flow in turn demands a large quantity of energy. In order to maintain the temperature on the level required by the conversion throughout the whole process, oxygenous gas must be added on different levels. For keeping the gas temperature on a sufficiently high level, a large number of lances is needed for fuel supply. In addition, the high energy demand and large quantity of fuel increase $CO_2$ emissions.

OBJECT OF INVENTION

The object of the invention is to introduce a new, more efficient, more environmentally friendly and energy-efficient way for treating spodumene, particularly for processing it thermally in a fluidized bed reactor, so that a desired structure is obtained for spodumene with respect to further processing.

SUMMARY OF INVENTION

The essential novel features of the invention are apparent from the appended claims.

The invention relates to a method for thermally processing α-spodumene, i.e. lithium aluminum silicate, by which treatment it is transformed into β-spodumene, which is more advantageous for further processing; according to said method, concentrate or ore with a grain size of 20-1,000 μm is processed in a fluidized bed reactor, at a temperature of 800-1,000° C., by using an oxygenous gas as the fluidizing gas. According to the invention, heat transfer to the nuclei of the particles to be processed takes place more rapidly in a fine-grained material than in a coarser material, in other words the delay caused by the heating of spodumene in the reactor is shorter with a finer material, i.e. when the concentrate grain size is advantageously 20-1,000 μm.

According to an embodiment of the invention, oxygenous fluidizing gas is fed into the fluidized bed reactor, depending on the grain size of the feed, so that the free-space velocity of gas is 0.3-1 m/s.

The oxygen content of the oxygenous fluidizing gas to be fed in the fluidized bed reactor equals the oxygen quantity required by the oxidation of the fuel needed for heating the fluidized bed.

According to an embodiment of the invention, the fluidized bed is a bubbling bed. When operating according to the method of the invention, heat transfer in the suspension bed is effective. The energy consumption in the process is minimized in many different ways. When using a bubbling bed, where the gas velocity and at the same time the gas flow is small, the heated gas flow is not too large. According to the invention, the energy from the hot exhaust gas is used for drying and preheating the feed, which reduces the quantity of fuel needed in the reactor. The energy content of the hot product removed from the fluidized bed reactor is used for preheating the process gas, which reduces the quantity of fuel needed in the reactor.

According to an embodiment of the invention, the delay of spodumene in the fluidized bed is no more than one hour, preferably 15 minutes to 1 hour.

The energy contained in the hot gas discharged from the fluidized bed reactor is utilized in the drying and preheating of the material to be fed in the fluidized bed reactor. According to the invention, at least part of the dust conveyed along with the gas discharged from the fluidized bed reactor, which dust is recovered by a cyclone and a fiber filter, is returned to the bubbling fluidized bed. According to the invention, liquid, gaseous or solid fuel is fed to the bubbling fluidized bed by lances.

According to a preferred embodiment of the invention, the energy contained in the hot product discharged from the fluidized bed reactor is utilized in the preheating of the combustion/fluidizing air to be fed in the fluidized bed reactor, in the fluidized bed cooler of the product.

Dust is recovered from the hot, oxygenous gas discharged from the fluidized bed cooler prior to feeding the gas to the fluidized bed reactor. The dust obtained from the fluidized bed cooler is combined in the product.

According to the invention, the temperature of the fluidized bed is chosen according to the impurity contents of the spodumene and the fuel, by avoiding an excessive formation, i.e. over 15%, of molten phases in the bed.

While using a bubbling fluidized bed according to the invention, where the employed feed is fine-grained concentrate or ore, and by making use of the energy flows contained in the hot exhaust gas and the hot product, there is advantageously achieved, with relatively low energy consumption, an effective thermal conversion of spodumene.

LIST OF DRAWINGS

An arrangement according to the invention is described in more detail with reference to the appended drawing, where FIG. 1 illustrates the invention as a block diagram.

DETAILED DESCRIPTION OF INVENTION

According to the invention, spodumene concentrate or ore, i.e. lithium aluminum silicate, is processed thermally in a fluidized bed reactor in order to convert it to a desired soluble form for separating lithium. The filtered lithium concentrate (moisture in concentrates being generally ~10%) is conducted in the process line in countercurrent to the hot process gas to be removed from the fluidized bed reactor. Now the hot gas is in direct contact with the concentrate. The concentrate is dried and heated while the gas is cooled, i.e. the concentrate is dried and preheated prior to being thermally processed in the fluidized bed reactor, in a bubbling fluidized bed.

In the bubbling bed of the fluidized bed reactor, the lithium concentrate is subjected to conversion, i.e. the α-spodumene is, owing to the effect of heat, converted to soluble β-spodumene. This change takes place when the temperature is 800-1,000° C., but yet so that the formation of molten phases formed by impurities is minimized by selecting the temperature. According to the invention, the grain size of the lithium concentrate fed in the fluidized bed reactor is 20-1000 μm. The delay of the material in the fluidized bed is preferably less than 1 hour, when the free-space velocity of the gas is 0.3-1 m/s. In the fluidized bed, the fuel fed therein (can be gaseous, liquid or solid) reacts with the oxygenous fluidizing/process gas. The process gas in a fluidized bed reactor is composed of gas and air that was used for cooling the fluidized bed reactor product and preheated in the process. When burning, the fuel must generate sufficient energy for heating both the spodumene and the gas in the fluidized bed reactor. Dust is recovered in a cyclone from the gas exhausted from the fluidized bed reactor. The energy content of dust-free gas is utilized for drying and preheating the concentrate. The thermal capacity of the product treated in the fluidized bed reactor is made use of in a fluidized bed cooler, where the energy contained in the product is transferred in the gas, and the cooled product is removed. Air is fed as fluidizing gas into the multiblock fluidized bed cooler, and the hot spodumene product removed from the fluidized bed reactor is also fed in said cooler. Fluidizing air is heated as the spodumene is cooled. The hot oxygenous gas exhausted from the fluidized bed cooler is conducted to the process reactor as fluidizing and combustion gas. The products must be cooled in order to improve the wear of the conveyors and to make the processing easier.

EXAMPLE

In the example below, the invention is discussed with reference to the energy balance in the conversion process of α-spodumene taking place in a fluidized bed reactor. Spodumene concentrate is fed to be processed in a fluidized bed reactor. In order to facilitate the desired conversion from α-spodumene to β-spodumene, energy is needed for raising the temperature. The temperature is raised to 950° C., in which case the methane demand is 55 $Nm^3$ per ton of spodumene concentrate. For burning the methane, there is needed 110 $NM^3$ oxygen, which equals 524 $Nm^3$ when calculated as air. In that case the size of the furnace is defined according to the feed quantity and spodumene grain size, so that the bed forms a bubbling bed (free-space velocity according to grain size 0.3-1 m/s), and there is sufficiently oxygen for oxidizing the fuel needed in the heating of spodumene. When, according to the example, 524 $Nm^3$ air is cooled from 950° C. to 200° C., the quantity of released energy s 156 kWh, which is made use of in the drying and preheating processes. As one ton of spodumene exhausted from the fluidized bed reactor at the temperature of 950° C. is cooled down to 70° C., the quantity of released energy is 300 kWh, which is made use of in the preheating of the process gas.

For a person skilled in the art, it is obvious that along with the development of technology, the principal idea of the invention can be realized in many different ways. Thus the invention and its embodiments are not restricted to the above described examples, but they may vary within the scope of the appended claims.

The invention claimed is:

1. A method for thermally processing α-spodumene by which treatment it is transformed into ρ-spodumene; wherein concentrate or ore with a grain size of 20-1,000 μm is processed in a fluidized bed reactor, at a temperature within a range of 800-1,000° C., by using an oxygenous gas as the fluidizing gas, wherein the temperature within the range 800-1,000° C. is chosen to limit formation of molten phases to less than 15% in the fluidized bed; and wherein such method outputs β-spodumene, discharged gas, and dust, followed by using the thermal energy of the discharged gas to preheat air to be fed into the fluidized bed reactor, wherein at least part of the dust is recovered by a cyclone and a fiber filter and returned to the fluidized bed reactor and wherein the dust obtained from a fluidized bed cooler is combined with the discharged gas.

2. A method according to claim 1, further comprising the step of feeding oxygenous fluidizing gas into the fluidized bed reactor so that the free-space velocity of gas is 0.3-1 m/s.

3. A method according to claim 1, wherein the oxygen content of the oxygenous fluidizing gas to be fed in the fluidized bed reactor equals an oxygen quantity required by the oxidation of the fuel needed for heating the fluidized bed.

4. A method according to claim 1, wherein the fluidized bed is a bubbling bed.

5. A method according to claim 1, wherein the delay of spodumene in the fluidized bed is no more than one hour.

6. A method according to claim 1, wherein the discharged gas is utilized in the drying and preheating of a next material to be fed in the fluidized bed reactor.

7. A method according to claim 4, wherein fuel is fed to the bubbling fluidized bed reactor by lances.

8. A method according to claim 1, wherein dust is recovered prior to feeding the discharged gas to the fluidized bed reactor.

9. A method of thermally processing α-spodumene into β-spodumene, comprising the steps of:
   a. Setting a first processing temperature of a fluidized bed reactor of 800-1,000° C. corresponding to an α-spodumene impurity content;
   b. Selecting a quantity of α-spodumene having an active grain size of 20-1,000 μm and an active impurity content;
   c. Feeding the selected quantity of α-spodumene into the fluidized bed reactor;

d. Setting a free-space velocity of fluidizing gas fed into the fluidized bed reactor within the range of 0.3-1 m/s;
e. Utilizing the energy content of gas exhausted from the fluidized bed reactor for drying and preheating the α-spodumene; and
f. Recovering dust released with the gas exhausted from the fluidized bed reactor in a cyclone and a fiber filter and returned to the fluidized bed reactor; wherein the dust obtained from a fluidized bed cooler is combined with the discharged gas.

* * * * *

UNITED STATES PATENT AND TRADEMARK OFFICE
CERTIFICATE OF CORRECTION

| | | |
|---|---|---|
| PATENT NO. | : 9,068,240 B2 | Page 1 of 1 |
| APPLICATION NO. | : 13/643502 | |
| DATED | : June 30, 2015 | |
| INVENTOR(S) | : Maija-Leena Metsärinta | |

It is certified that error appears in the above-identified patent and that said Letters Patent is hereby corrected as shown below:

In the claims,

Col. 4, Line 25

"ρ-spodumene" should read --β-spudomene--

Signed and Sealed this
Tenth Day of November, 2015

Michelle K. Lee
*Director of the United States Patent and Trademark Office*